3,649,701
PREPARATION OF SOLUTIONS OF
CYCLOHEXYLLITHIUM
William Novis Smith, Jr., Exton, Pa., assignor to Foote
Mineral Company, Exton, Pa.
No Drawing. Filed Feb. 26, 1969, Ser. No. 802,668
The portion of the term of the patent subsequent to
Dec. 29, 1987, has been disclaimed
Int. Cl. C07f 1/02
U.S. Cl. 260—665 R          7 Claims

ABSTRACT OF THE DISCLOSURE

Relatively concentrated solutions of cyclohexyllithium are prepared by reacting cyclohexyl chloride and lithium metal in an alkyl substituted benzene solvent.

This invention relates to a process for preparing relatively concentrated solutions of cyclohexyllithium, that is solutions having a concentration of cyclohexyllithium of greater than 0.2 molar.

BACKGROUND OF THE INVENTION

Cyclohexyllithium is a known compound used, preferably in the form of a relatively concentrated solution, as a catalytic agent for dimerizations, polymerizations, condensations and the like, as well as for carrying out metalation reactions, as in metathetical reactions involving replacement of lithium with another metal or a non-metal or with an organic radical. It is generally prepared by reacting a cyclohexyl halide with lithium metal. Typical solvent systems used in the reaction, according to the literature, include petroleum ether, pentane and diethyl ether. However, cyclohexyllithium is not very soluble in the aliphatic hydrocarbon solvents, and it forms largely as a precipitate along with the lithium halide by-product. Due to the low concentration, it is not feasible to isolate the cyclohexyllithium from the initial reaction mixture; thus the whole slurry has been used, either unfiltered or partially filtered, as a source of cyclohexyllithium. While cyclohexyllithium is somewhat more soluble in diethyl ether, it cleaves the diethyl ether rapidly, and this solution is, therefore, unstable. Thus, it has not been possible heretofore to obtain concentrated stable solutions of cyclohexyllithium. Additionally, the known reactions produce yields of less than 50% cyclohexyllithium.

Pats. 2,914,578, 2,987,558 and 3,122,592 disclose reacting an alkali metal (or hydride thereof) with an organic compound (including an organic chloride), and mention widely differing solvents, including toluene and xylene. However, none of these teaches the process of the present invention and the advantageous results obtained thereby. Accordingly, it is the object of the present invention to prepare relatively concentrated, stable solutions of cyclohexyllithium, and to prepare these concentrated solutions by a process which yields substantial quatities of cyclohexyllithium.

It has been found that the solubility of cyclohexyllithium increases markedly when cyclohexyl chloride and lithium metal are reacted in a solvent system composed of a lower alkyl-substituted benzene. The alkyl substituent or substituents may be straight or branched and may contain from one to three carbon atoms. There may be from one to three such alkyl substituents on the benzene ring, although the total number of carbon atoms provided by the alkyl substituents generally will not exceed six. Particularly desirable solvent systems are toluene and xylene due to their general availability and low cost. Also useful are cumene (isopropyl benzene), mesitylene (1,3,5-trimethyl benzene), ethyl benzene and the like. Mixtures of such compounds may be used. The solvents should be anhydrous.

The reaction involves two moles of lithium metal per mole of cyclohexyl chloride. In practice, it is preferred to employ excess lithium, and this excess may reach about 2 moles per mole over the theoretical amount of cyclohexyl chloride, although an excess of up to about 1 mole of lithium is generally ample.

The concentration of the reactants will be such as to provide a concentration of cyclohexyllithium in the mixture greater than 0.2 molar and the concentration of the cyclohexyllithium, by virtue of the concentration of the reactants, may, and preferably does, reach saturation.

The lithium metal employed should be finely-divided. While small pieces of lithium, such as cut lithium wire, may be used, it is preferred to use the well known lithium dispersion. Such dispersions are prepared by rapidly stirring molten lithium metal into an inert liquid such as mineral oil or one of the solvents used in accordance with the present process, so that the metal solidifies as very tiny droplets, generally no more than 100 microns in size and most usually from about 25 to about 75 microns in size. The finely-divided lithium metal may be filtered from the liquid to provide, after washing and drying, what is known as dry dispersion, or, after simply removing the bulk of the liquid (if it is not a solvent of the type desired for the present process) as by filtering or decanting, the lithium may be washed with and reslurried in a solvent of the type to be used in the present process.

Advantageously, a small amount of sodium will be included with the lithium, as by adding sodium to the molten lithium in preparing the above-described dispersion. The amount of sodium so added will generally range from about 0.3 to about 2%, and preferably from about 0.5 to about 1%, by weight, based on the weight of the lithium.

It is also advantageous, as is generally the case involving lithium metal, that the reaction be carried out under an atmosphere substantially devoid of oxygen and water vapor. Hence, in accordance with known practice, an inert atmosphere, such as argon, nitrogen, and the like, is employed.

From the procedural standpoint, the broader aspect of the invention comprises simply mixing the lithium metal, cyclohexyl chloride and lower alkyl-substituted benzene, and preferably heating. In accordance with preferred practice, the finely-divided lithium metal is initially dispersed in the alkyl-substituted benzene and the cyclohexyl chloride is gradually added to the lithium dispersion. The reaction may be initiated by the addition of a small portion of the cyclohexyl chloride and the remainder of the cyclohexyl chloride then added over a period of from about ½ to about 4 hours.

It has also been found that the temperature at which the reaction is carried out bears a great effect on the solubility of cyclohexyllithium. Temperatures above ambient conditions, and up to refluxing (the boiling point) permit the formation of more highly concentrated cyclohexyllithium solutions which can be freed, while still hot, of lithium chloride and excess lithium, as by filtering, centrifuging, and the like. For example, the concentration of a saturated solution of cyclohexyllithium in toluene at 23° C. is 0.33 M and at 37° C. it is 0.69 M. However, it is not critical that the reaction be carried out at elevated temperatures, as satisfactory concentrations and yields may be achieved at room temperature. When elevated temperatures are desired, the reaction mixture may be heated to a temperature of from above room temperature to about 60° C., preferably to a temperature of from about 30° C. to about 55° C. The elevated temperature should be maintained from about ½ to about 4 hours, preferably from about 2 to about 3 hours, to insure complete reaction. Longer reaction times are required when the reaction is run at room temperature.

Following the reaction, the solid material, mainly lithium chloride and excess unreacted lithium and possibly some precipitated cyclohexyllithium if the concentration of reactants is equivalent to a concentration of cyclohexyllithium above saturation at the particular temperature, may be removed mechanically from the mixture as by filtering, centrifuging, and the like.

The solubility of cyclohexyllithium in various solvents and at various temperatures is shown in Table I.

TABLE I

| Solvent: | Solubility |
|---|---|
| Cyclohexane, cyclopentane, hexane, pentane, isopentane, isooctane, benzene. | Below 0.2 M (most below 0.1 M at room temperature). |
| Toluene | 0.4–0.5 M at room temperature. |
| O-, m-, or p-xylene | 0.3 M at 23° C. |
| Ethyl benzene | 0.26 M at 23° C. |

The process of the present invention will be more readily understood from a consideration of the following specific examples which are given for the purpose of illustration only and are not intended to limit the scope of the invention in any way.

Example 1

Preparation of cyclohexyllithium in toluene.—A 3-necked, round-bottom, 500 ml. reaction flask equipped with a stirrer, pressure-equalizing dropping funnel and thermometer was flushed with argon and then charged with 5.3 of 1% sodium-lithium dry dispersion and 250 ml. toluene. The reaction was initiated with 4 ml. cyclohexyl chloride and the rest of the 360 ml. (0.305 mole) cyclohexyl chloride was added over a 2 hour period with the temperature maintained at 50°–53° C. The reaction solution was stirred one hour longer, after the addition was finished, at 50° C. Another 50 ml. of toluene was added and the solution was filtered hot using 100 ml. of toluene as a rinse. The solution weighed 373 g. and contained 5.62%, by weight, of cyclohexyllithium (0.585 M), using the difference of a total and Gilman titration. The yield was 76.6% and the solution was saturated at 30° C. The saturated solution of cyclohexyllithium was 0.606 M at 30° C., by total base titration.

Example 2

Preparation of cyclohexyllithium in o-xylene.—A 3-necked, round-bottom, 500 ml. reaction flask equipped with stirrer, reflux condenser, pressure-equalizing dropping funnel and thermometer was flushed with argon and then charged with 10 g. of 1% sodium-lithium dry dispersion and 250 ml. o-xylene. The reaction was initiated with 4 ml. cyclohexyl chloride and the rest of the 55 ml. (0.466 mole) cyclohexyl chloride was added at 40–45° C. over a 2 hour period. The slurry was stirred for 1 hour longer at 40–45° C. and then filtered. Crystals precipitated on cooling the filtrate to room temperature. The saturated solution of cyclohexyllithium was 0.375 M at 23° C. and 0.665 M at 30° C. by total base titration.

Example 3

Preparation of cyclohexyllithium in cumene (isopropyl benzene).—A 3-necked, round-bottom, 500 ml. reaction flask equipped with stirrer, reflux condenser, pressure-equalizing dropping funnel and thermometer was flushed with argon and then charged with 10 g. of 1% sodium-lithium dry dispersion and 250 ml. cumene. The raction was initiated with 4 ml. cyclohexyl chloride and the rest of the 55 ml. (0.466 mole) cyclohexyl chloride was added at 40–45° C. over a 2 hour period. The slurry was stirred for 1 hour longer at 40*45° C. and then filtered. Crystals precipitated on cooling the filtrate to room temperature. The saturated solution of cyclohexyllithium was 0.230 M at 23° C. and 0.365 M at 28° C. by total base titration.

Example 4

Preparation of cyclohexyllithium in mesitylene (1,3,5-trimethyl benzene).—A 3-necked, round-bottom, 500 ml. reaction flask equipped with stirrer, reflux condenser, pressure-equalizing dropping funnel and thermometer was flushed with argon and then charged with 10 g. of 1% sodium-lithium dry dispersion and 250 ml. mesitylene. The reaction was initiated with 4 ml. cyclohexyl chloride and the rest of the 55 ml. (0.466 mole) cyclohexyl chloride was added at 40–45° C. over a 2 hour period. The slurry was stirred for 1 hour longer at 40–45° C. and then filtered. Crystals precipitated on cooling the filtrate to room temperature. The saturated solution of cyclohexyllithium was 0.300 M at 23° C. by total base titration.

Example 5

Preparation of cyclohexyllithium in m-xylene.—A 3-necked, round-bottom, 500 ml. reaction flask equipped with stirrer, reflux condenser, pressure-equalizing dropping funnel and thermometer was flushed with argon and then charged with 10 g. of 1% sodium-lithium dry dispersion and 250 ml. m-xylene. The reaction was initiated with 4-ml. cyclohexyl chloride and the rest of the 55 ml. (0.466 mole) cyclohexyl chloride was added at 40–45° C. over a 2 hour period. The slurry was stirred for 1 hour longer at 40–45° C. and then filtered. Crystals precipitated on cooling the filtrate to room temperature. The saturated solution of cyclohexyllithium was 0.305 M at 23° C. and 0.500 M at 27° C. by total base titration.

Example 6

Preparation of cyclohexyllithium in ethyl benzene.—A 3-necked, round-bottom, 500 ml. reaction flask equipped with stirrer, reflux condenser, pressure-equalizing dropping funnel and thermometer was flushed with argon and then charged with 10 g. of 1% sodium-lithium dispersion and 250 ml. ethyl benzene. The reaction was initiated with 4 ml. cyclohexyl chloride and the rest of the 55 ml. (0.466 mole) cyclohexyl chloride was added at 40–45° C. over a 2 hour period. The slurry was stirred for 1 hour longer at 40–45° C. and then filtered. Crystals precipitated on cooling the filtrate to room temperature. The saturated solution of cyclohexyllithium was 0.260 M at 23° C. and 0.350 M at 26° C. by total base titration.

By way of comparison, the following example illustrates the results obtained when the reaction is carried out in a saturated straight chain hydrocarbon.

Example 7

Preparation of cyclohexyllithium in pentane.—A 3-necked, round-bottom, 500 ml. reaction flask equipped with a stirrer, reflux condenser, pressure-equalizing dropping funnel and thermometer was flushed with argon and then charged with 4.2 g. of 1% sodium-lithium dry dispersion and 300 ml. pentane. The reaction was initiated with 4 ml. cyclohexyl chloride in refluxing pentane and the rest of the 20 ml. (0.109 mole) of cyclohexyl chloride was added over a 1 hour period at reflux. The slurry was refluxed and stirred one hour longer and then filtered hot. Crystals of cyclohexyllithium were observable in the flask before filtration. The warm filtered solution deposited more cyclohexyllithium on cooling to room temperature. The total base concentration of cyclohexyllithium was 0.09 M at 23° C. for the saturated solution.

Modification is possible in the selection of alkyl-substituted benzene solvent and in the particular procedure followed without departing from the scope of the invention.

What is claimed is:
1. In the preparation of a solution of cyclohexyllithium by reacting one mole of cyclohexyl chloride with two moles of lithium metal in an organic solvent reaction me- dium, the improvement comprising reacting said cyclohexyl chloride with said lithium in a lower alkyl-substituted benzene, the concentration of said cyclohexyl chloride and said lithium being that providing a concentration of cyclohexyllithium in solution in said lower alkyl-substituted benzene greater than 0.2 molar.

2. A process according to claim 1 wherein the lower alkyl substituted benzene is selected from the group consisting of toluene and xylene.

3. A process according to claim 1 wherein the reaction is carried out at a temperature of from about room temperature to about 60° C.

4. A process according to claim 3 wherein the reaction is carried out at a temperature of from about 30° to about 55° C.

5. A process according to claim 1 wherein the reaction is carried out at reflux.

6. A process according to claim 1 wherein, after said reaction, solids are removed from the reaction mixture.

7. A process according to claim 6 wherein said solids are removed from the reaction mixture at a temperature above room temperature and up to the boiling point of the mixture.

References Cited

UNITED STATES PATENTS 3,511,884.    5/1970    Smith _____ 260—665

OTHER REFERENCES

Wittig, Newer Methods of Preparative Organic Chemistry, 1948, Interscience Publishers, New York, N.Y., pp. 575–6.

Johnson et al., J. Am. Chem. Soc. 71 (1949), p. 1721.

TOBIAS E. LEVOW, Primary Examiner

A. P. DEMERS, Assistant Examiner

U.S. Cl. X.R.

252—431 R